(12) United States Patent
Tang et al.

(10) Patent No.: US 12,438,405 B2
(45) Date of Patent: Oct. 7, 2025

(54) SEGMENTED CORE WITH SMC SECTIONS WITH PLURALITY OF LAMINATION GROUPS HAVING DIFFERENT SIZES

(71) Applicant: ZHEJIANG PANGOOD POWER TECHNOLOGY CO., LTD., Zhejiang (CN)

(72) Inventors: Lei Tang, Jinhua (CN); Yixiong Li, Jinhua (CN)

(73) Assignee: ZHEJIANG PANGOOD POWER TECHNOLOGY CO., LTD., Jinhua (CN)

( * ) Notice: Subject to any disclaimer, the term of this patent is extended or adjusted under 35 U.S.C. 154(b) by 31 days.

(21) Appl. No.: 18/393,691

(22) Filed: Dec. 22, 2023

(65) Prior Publication Data

US 2024/0128807 A1  Apr. 18, 2024

Related U.S. Application Data

(63) Continuation of application No. 17/272,038, filed as application No. PCT/CN2019/100587 on Aug. 14, 2019, now Pat. No. 11,929,641.

(30) Foreign Application Priority Data

Aug. 31, 2018 (CN) .......................... 201811008331.4
Aug. 31, 2018 (CN) .......................... 201811008350.7

(51) Int. Cl.
  *H02K 1/14* (2006.01)
(52) U.S. Cl.
  CPC .................................. *H02K 1/148* (2013.01)

(58) Field of Classification Search
  CPC ........... H02K 1/148; H02K 1/12; H02K 1/02; H02K 1/146; H02K 1/27; H02K 1/06;
  (Continued)

(56) References Cited

U.S. PATENT DOCUMENTS

| 2 A | * | 7/1836 | Goulding | ............... D01G 21/00 |
| | | | | 57/58.49 |
| 6,069,431 A | * | 5/2000 | Satoh | ....................... H02K 1/02 |
| | | | | 310/43 |

(Continued)

FOREIGN PATENT DOCUMENTS

JP  2017060281 A  *  3/2017

OTHER PUBLICATIONS

JP-2017060281-A English Translation.*

*Primary Examiner* — Maged M Almawri
(74) *Attorney, Agent, or Firm* — Kilpatrick Townsend & Stockton LLP (57) ABSTRACT

A segment core and an axial flux motor. The segment core is formed by covering an SMC core (100, 100') over an outer peripheral surface of a laminated core (200, 200'). An outer surface of the segment core, which can not be processed easily, is shaped by processing the easily shapeable SMC core (100, 100'). The entire structure of the laminated core (200, 200') is relatively simple, and thus a mold for processing the laminated core (200, 200') requires simpler specifications. Moreover, the mold can be used to perform processing easily, to reduce difficulties of processing the segment core. The segment core has better electromagnetic performance than a segment core solely using an SMC material, and has a higher core utilization rate than a segment core solely using a laminated core (200, 200').

19 Claims, 8 Drawing Sheets

(58) Field of Classification Search
CPC ...... H02K 1/17; H02K 1/276; H02K 2203/12; H02K 2203/15; H02K 2213/03
USPC .......... 310/44, 43, 45, 179, 208, 42, 154.11, 310/156.53, 156.57, 216.067, 259, 258, 310/254
See application file for complete search history.

(56) References Cited

U.S. PATENT DOCUMENTS

| | | | | |
|---|---|---|---|---|
| 6,809,453 B2* | 10/2004 | Narita | .................... | H02K 17/02 310/268 |
| 7,323,799 B2* | 1/2008 | Naito | .................... | H02K 1/148 310/216.077 |
| 7,358,639 B2* | 4/2008 | Caamano | ............... | H02K 1/141 310/216.037 |
| 7,528,521 B2* | 5/2009 | Naitou | ................. | H02K 1/2795 310/268 |
| 10,177,631 B1* | 1/2019 | Hopkins | ................ | H02K 1/148 |
| 10,763,716 B2* | 9/2020 | Tokoi | .................... | H02K 3/524 |
| 10,848,016 B2* | 11/2020 | Shiohara | ............... | H02K 1/146 |
| 11,165,312 B2* | 11/2021 | Tokoi | ........................ | H02K 1/20 |
| 11,205,935 B2* | 12/2021 | Enomoto | ............ | H02K 1/2795 |
| 11,296,572 B1* | 4/2022 | Kislev | ................. | H02K 15/066 |
| 2003/0057796 A1* | 3/2003 | Fan | .......................... | H02K 1/02 310/216.062 |
| 2004/0212256 A1* | 10/2004 | Sugishima | ............. | H02K 3/487 29/598 |
| 2005/0073213 A1* | 4/2005 | Naito | .................... | H02K 1/148 310/156.32 |
| 2006/0043821 A1* | 3/2006 | Kojima | ................. | H02K 21/24 310/268 |
| 2010/0156204 A1* | 6/2010 | Endo | ..................... | H02K 3/522 310/216.069 |
| 2010/0187934 A1* | 7/2010 | Asano | ................. | H02K 1/2795 310/156.32 |
| 2011/0095628 A1* | 4/2011 | Enomoto | ............... | H02K 1/148 310/44 |
| 2011/0221297 A1* | 9/2011 | Langford | ............ | H02K 15/024 310/215 |
| 2011/0309726 A1* | 12/2011 | Carpenter | .............. | H02K 21/24 310/75 R |
| 2012/0235530 A1* | 9/2012 | Moya | ..................... | H02K 21/24 310/156.01 |
| 2012/0262022 A1* | 10/2012 | Takemoto | ............ | H02K 1/2796 310/156.35 |
| 2013/0009508 A1* | 1/2013 | Takamatsu | ........... | H02K 1/2796 310/156.32 |
| 2013/0278103 A1* | 10/2013 | McPherson | ............ | H02K 15/02 310/154.02 |
| 2014/0015358 A1* | 1/2014 | Wan | ....................... | H02K 3/522 310/198 |
| 2014/0070659 A1* | 3/2014 | Lee | .......................... | H02K 1/02 310/216.104 |
| 2014/0103777 A1* | 4/2014 | Santos | ................. | H02K 15/022 310/254.1 |
| 2014/0265653 A1* | 9/2014 | Heins | ..................... | H02K 1/143 310/198 |
| 2015/0303745 A1* | 10/2015 | Matsumoto | ............ | H02K 9/223 310/43 |
| 2015/0349588 A1* | 12/2015 | Tokoi | ...................... | H02K 3/34 310/208 |
| 2016/0065020 A1* | 3/2016 | Tokoi | ................... | H02K 1/2795 310/156.08 |
| 2017/0025927 A1* | 1/2017 | Weerts | ..................... | H02K 3/24 |
| 2017/0222496 A1* | 8/2017 | Wang | ...................... | F04D 13/06 |
| 2017/0250580 A1* | 8/2017 | Rhyu | ...................... | H02K 1/12 |
| 2018/0219442 A1* | 8/2018 | Heins | .................. | H02K 1/2796 |
| 2019/0288584 A1* | 9/2019 | Vansompel | ............ | H02K 9/227 |
| 2020/0067357 A1* | 2/2020 | Post | ....................... | H02K 21/24 |
| 2021/0028663 A1* | 1/2021 | Hong | ....................... | H02K 3/18 |
| 2021/0152040 A1* | 5/2021 | Yao | ......................... | H02K 1/14 |
| 2021/0288569 A1* | 9/2021 | Yao | ...................... | H02K 1/2798 |
| 2022/0271578 A1* | 8/2022 | Horiuchi | ................ | B33Y 80/00 |

* cited by examiner

SEGMENTED CORE WITH SMC SECTIONS WITH PLURALITY OF LAMINATION GROUPS HAVING DIFFERENT SIZES

This application is a continuation of U.S. patent application Ser. No. 17/272,038, titled "SEGMENT CORE AND AXIAL FLUX MOTOR", filed on Feb. 26, 2021, which is a National Stage application of PCT international application PCT/CN2019/100587, filed on Aug. 14, 2019, which claims priority to Chinese Patent Application No. 201811008331.4, titled "SEGMENT CORE AND AXIAL FLUX MOTOR" and Chinese Patent Application No. 201811008350.7, titled "SEGMENT CORE AND AXIAL FLUX MOTOR", filed on Aug. 31, 2018 with the Chine National Intellectual Property Administration (CNIPA), which are incorporated herein by reference in their entireties.

FIELD

The present disclosure relates to the field of motor, and particularly, to a segmented core and a pancake motor.

BACKGROUND

A pancake core of a pancake motor is classified into an overall core and a segmented core. For most pancake motor structures with an intermediate single stator, the pancake core is a segmented core.

At present, the segmented core is generally formed by stacking silicon steel sheets with different sectional dimensions or by adopting a soft magnetic composite (SMC) integral molding method. In case that the silicon steel sheets with different sectional dimensions are laminated, a large number of specifications of silicon steel sheets lead to a need for a large number of specifications of molds, which increases processing difficulty. In some cases the SMC integral molding method is adopted. Although it is easy to mold, electromagnetic performance of an SMC material is poor, which results in poor magnetic permeability and large loss.

SUMMARY

In view of above, embodiments of the present disclosure is how to improve electromagnetic performance while reducing manufacturing difficulty of a segmented core. To this end, a segmented core and a pancake motor are provided in the present disclosure.

To achieve the above object, the following embodiments are provided in the present disclosure.

A segmented core includes a laminated core and an SMC core, the SMC core is coated on a periphery of the laminated core by splicing, and the SMC core is installed inside a prefabricated coil by splicing or a coil is directly wound around a periphery of the SMC core.

In one embodiment, in the above segmented core, the SMC core includes a first SMC core and a second SMC core, the first SMC core and the second SMC core are coated on the periphery of the laminated core by splicing, and the first SMC core and the second SMC core are installed inside the prefabricated coil after being spliced or the coil is directly wound around the periphery of the SMC core.

In one embodiment, in the above segmented core, the first SMC core includes an SMC winding bar and an SMC embedded groove adapted to the laminated core, and the SMC embedded groove is a non-through structure or a through structure.

In one embodiment, in the above segmented core, an SMC pole shoe is provided at one end of the SMC winding bar away from the SMC embedded groove.

In one embodiment, in the above segmented core, one end of the SMC winding bar close to the SMC embedded groove is provided with a first positioning protrusion and/or a first positioning hole that is adapted to the second SMC core.

In one embodiment, in the above segmented core, the end of the SMC winding bar that is set with the SMC embedded groove is provided with a second positioning protrusion and/or a second positioning hole that is adapted to the second SMC core.

In one embodiment, in the above segmented core, in a case that the first positioning protrusion and the first positioning hole are both provided, the first positioning protrusion and the first positioning hole are arranged symmetrically, and a size of the first positioning protrusion is adapted to a size of the first positioning hole.

In a case that the second positioning protrusion and the second positioning hole are both provided, the second positioning protrusion and the second positioning hole are arranged symmetrically, and a size of the second positioning protrusion is adapted to a size of the second positioning hole.

In one embodiment, in the above segmented core, the second SMC core has the same structure as the first SMC core.

In one embodiment, in the above segmented core, the laminated core is formed by laminations through laminating, and the lamination is a silicon steel sheet or an amorphous alloy sheet.

In one embodiment, in the above segmented core, the laminated core is formed by laminations of the same size through laminating, or the laminated core is formed by multiple segments of laminations that gradually become smaller in size through laminating.

A pancake motor is further provided in the present disclosure, including a first stator splint, a segmented core, a stator inner support, a second stator splint, and a casing, each segmented core is fixed in the casing by the first stator splint, the second stator splint, and the stator inner support, the segmented core is any one of the above segmented cores.

In the segmented core in the present disclosure, the SMC core is adopted to coat the periphery of the laminated core. A shape that is not easy to process is formed by processing the SMC core that is easy to be molded. An overall structure of the laminated core is relatively simple. Therefore, specifications of molds for processing the laminated core are less, and the molds are easy to be processed, which reduces processing difficulty of the segmented core. Moreover, electromagnetic performance of the segmented core is higher than that of core with only the SMC material, and an utilization rate of the core is higher than that of core with only the laminated core.

In addition, since the SMC core is a spliced structure, the SMC core is installed inside the prefabricated coil such as a preformed coil of flat type copper wire by splicing, to avoid a need for winding and improving production efficiency. In one embodiment, the coil is directly wound around the periphery of the SMC core.

Another segmented core is further disclosed in the present disclosure, including a laminated core and an SMC core wound around with a coil, the SMC core is coated on a periphery of the laminated core.

In one embodiment, in the above segmented core, the SMC core includes an SMC winding bar and an SMC embedded groove arranged on the SMC winding bar, a periphery of the SMC winding bar is configured to set the coil, and the SMC embedded groove is installed with the laminated core.

In one embodiment, in the above segmented core, an end surface of the SMC winding bar is provided with a first SMC pole shoe.

In one embodiment, in the above segmented core, an end surface of the SMC winding bar opposite to the end surface provided with the first SMC pole shoe is provided with a second SMC pole shoe.

In one embodiment, in the above segmented core, the SMC embedded groove is a rectangular structure.

In one embodiment, in the above segmented core, the SMC embedded groove is provided with multiple steps.

In one embodiment, in the above segmented core, the laminated core is formed by laminations through laminating, and the lamination is a silicon steel sheet, an amorphous alloy sheet, a permalloy sheet, or an iron-cobalt alloy sheet.

In one embodiment, in the above segmented core, the laminated core is formed by laminations of the same size through laminating.

In one embodiment, in the above segmented core, the laminated core is formed by multiple segments of laminations that gradually become smaller in size through laminating.

A pancake motor is further disclosed in the present disclosure, including any one of the above segmented cores.

It can be seen from the above embodiments that in the segmented core of the present disclosure, the SMC core is adopted to coat the periphery of the laminated core. A shape that is not easy to process is formed by processing the SMC core that is easy to be molded. An overall structure of the laminated core is relatively simple. Therefore, specifications of molds for processing the laminated core are less, and the molds are easy to be processed, which reduces processing difficulty of the segmented core. Moreover, electromagnetic performance of the segmented core is higher than that of core with only the SMC material, and an utilization rate of the core is higher than that of core with only the laminated core.

BRIEF DESCRIPTION OF THE DRAWINGS

In order to more clearly illustrate the embodiments of the present disclosure, the drawings used in the description of the embodiments or the prior art will be briefly introduced below. The drawings in the following description are merely some embodiments of the present disclosure.

In FIGS. 1 to 10, 100 is an SMC core, 200 is a laminated core, 300 is a coil, 400 is a first stator splint, 500 is a second stator splint, 600 is a stator inner support, 700 is a casing, 101 is a first SMC core, and 102 is a second SMC core, 1011 is an SMC winding bar, 1012 is an SMC embedded groove, 1013 is an SMC pole shoe, 1014 is a first positioning protrusion, 1015 is a first positioning hole, 1016 is a second positioning protrusion, 1017 is a second positioning hole.

In FIGS. 11 to 14, 100' is the SMC core, 200' is the laminated core, 300' is the coil, 101' is the SMC winding bar, 102' is the SMC embedded groove, 103' is a first SMC pole shoe, 104' is a second SMC pole piece, 1021' is a step.

DETAILED DESCRIPTION

Pancake motor: a pancake motor is also called an axial flux motor, and a direction of a magnetic field inside the motor is along an axial direction. Since the axial field motor is generally flat, it is also called a pancake motor.

SMC: a soft magnetic composite which is a magnetic core made by pressing iron powder coated with a special insulating material, and which may be manufactured into a flexible shape according to an actual need.

To this end, a core of the present disclosure is to provide a segmented core and a pancake motor, to improve electromagnetic performance while reducing manufacturing difficulty of the segmented core.

In addition, embodiments shown below do not intend to limit content of the disclosure described in the claims in any way. Furthermore, all contents of configurations shown in the following embodiments are not limited to necessary features for solutions of the disclosure described in the claims.

Please refer to FIGS. 1 to 10, a segmented core disclosed in the embodiments of the present disclosure includes a laminated core 200 and an SMC core 100. The SMC core 100 is coated on a periphery of the laminated core 200 by splicing, and the SMC core is installed inside a prefabricated coil by splicing or a coil is directly wound around a periphery of the SMC core.

In the segmented core in the present disclosure, the SMC core 100 is adopted to coat the periphery of the laminated core 200. A shape that is not easy to process is formed by processing the SMC core 100 that is easy to be molded. An overall structure of the laminated core 200 is relatively simple. Therefore, specifications of molds for processing the laminated core 200 are less, and the molds are easy to be processed, which reduces processing difficulty of the segmented core. Moreover, electromagnetic performance of the segmented core is higher than that of core with only the SMC material, and an utilization rate of the core is higher than that of core with only the laminated core 200.

In addition, since the SMC core 100 is a spliced structure, the SMC core 100 is installed inside a prefabricated coil such as a preformed coil of flat type copper wire by splicing, to avoid a need for winding and improving production efficiency. In one embodiment, the coil is directly wound around the periphery of the SMC core 100.

It should be noted that in the embodiments of the present disclosure, the SMC core 100 may coat the entire exterior of the laminated core 200, and the laminated core 200 is all located inside the SMC core 100. The SMC core 100 coats the periphery of the laminated core 200, and two ends of the laminated core 200 are not coated. The SMC core 100 coats the entire periphery or part of the periphery of the laminated core 200. When a part of the periphery is coated, a part of the laminated core 200 is exposed. There may be one concentrated part of the laminated core 200 that is exposed to outside, or the two ends of the laminated core 200 have parts that are both exposed to the outside.

The segmented core 100 includes a first SMC core 101 and a second SMC core 102, the first SMC core 101 and the second SMC core 102 are coated on the entire periphery of the laminated core 200 by splicing, and the first SMC core 101 and the second SMC core 102 are installed inside the prefabricated coil 300 (such as a preformed coil of flat type copper wire) by splicing or the coil 300 is directly wound around the periphery of the SMC core 100. In order to ensure entire electromagnetic performance, a shape of the SMC embedded groove 1012 fits a shape of the laminated core 200 in the embodiments of the present disclosure, for example, the SMC embedded groove 1012 has a rectangular structure; or the SMC embedded groove 1012 is provided with multiple steps.

Figure 1:
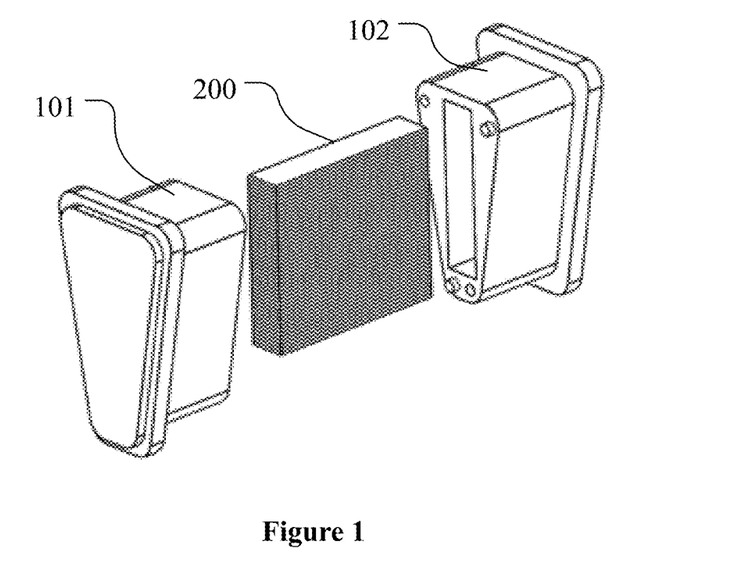
FIG. 1 is an exploded structure diagram of a segmented core according to an embodiment of the present disclosure.
Figure 2:
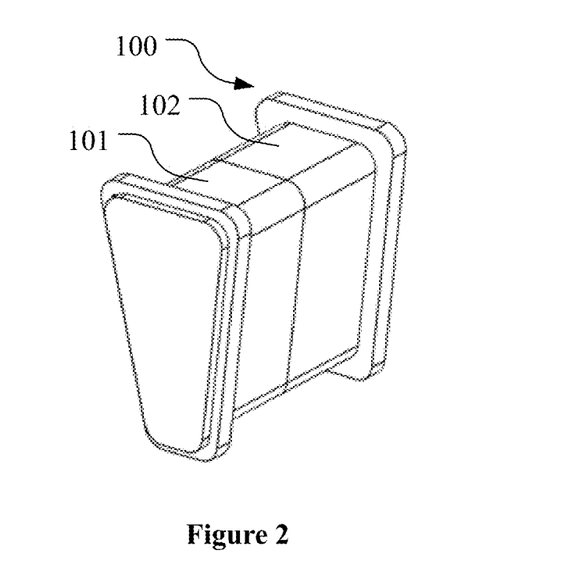
FIG. 2 is a stereochemical structure diagram of a segmented core after being spliced according to an embodiment of the present disclosure.
Figure 3:
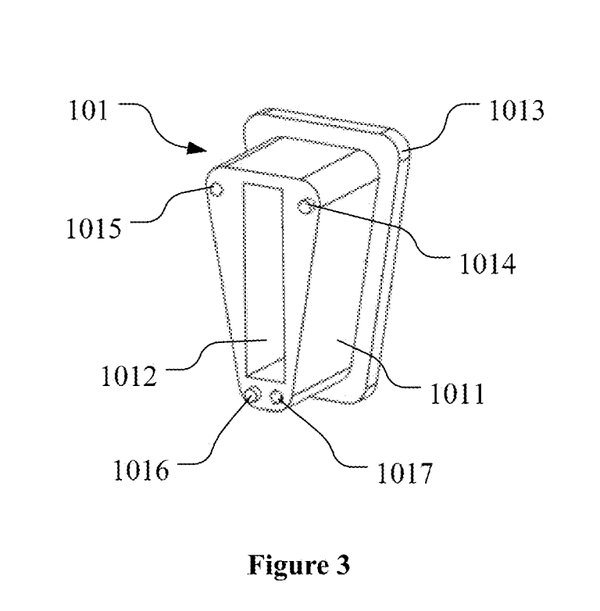
FIG. 3 is a stereochemical structure diagram of a first SMC core according to an embodiment of the present disclosure.
Figure 4:
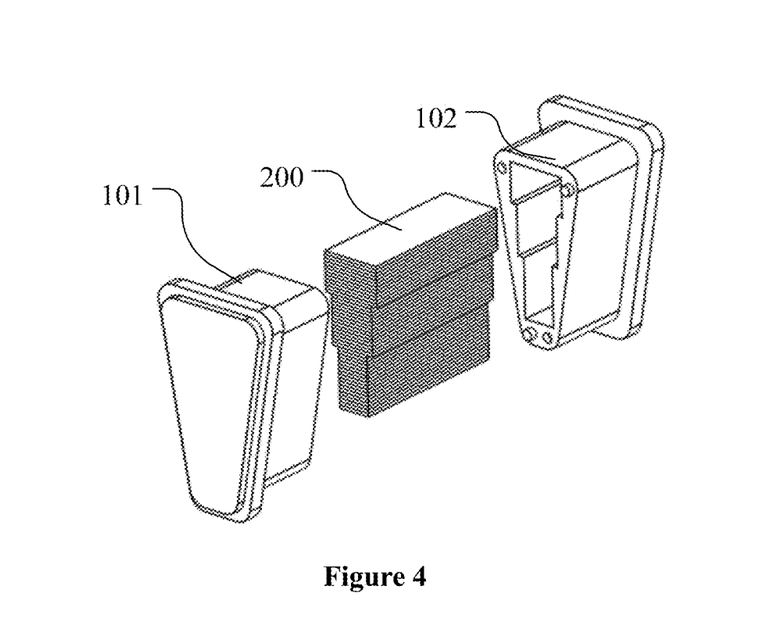
FIG. 4 is an exploded structure diagram of another segmented core according to an embodiment of the present disclosure.

Structures of the first SMC core 101 and the second SMC core 102 are the same or different. Take the first SMC core 101 as an example, the first SMC core 101 includes an SMC winding bar 1011 and the SMC embedded groove 1012 adapted to the laminated core 200, and the SMC embedded groove 1012 is a non-through structure or a through structure. After the first SMC core 101 and the second SMC core 102 are butted, the embedded groove in the first SMC core 101 is butted with an embedded groove in the second SMC core 102, and in this way an appearance structure of the entire laminated core 200 is spliced.

In order to optimize the above solution, an SMC pole shoe 1013 is provided at one end of the SMC winding bar 1011 away from the SMC embedded groove 1012. In order to enable the first SMC core 101 and the second SMC core 102 to be butted in a correct position, one end of the SMC winding bar 1011 close to the SMC embedded groove 1012 is provided with a first positioning protrusion 1014 and/or a first positioning hole 1015 adapted to the second SMC core 102. When butting, the first positioning protrusion 1014 of the first SMC core 101 is matched with the first positioning hole 1015 of the second SMC core 102, and the first positioning hole 1015 of the first SMC core 101 is matched with a first positioning protrusion 1014 of the second SMC core 102.

In other words, the first SMC core 101 may be provided with only one of the first positioning protrusion 1014 and the first positioning hole 1015, or may be provided with both the first positioning protrusion 1014 and the first positioning hole 1015. The second SMC core 102 may be provided with a corresponding structure to match the first positioning protrusion 1014 and/or the first positioning hole 1015 of the first SMC core 101.

Furthermore, one end of the SMC winding bar 1011 close to the SMC embedded groove 1012 is provided with a second positioning protrusion 1016 and/or a second positioning hole 1017 adapted to the second SMC core 102. When butting, the first positioning protrusion 1014 of the first SMC core 101 is matched with a second positioning hole 1017 of the second SMC core 102, and the second positioning hole 1017 of the first SMC core 101 is matched with a second positioning protrusion 1016 of the second SMC core 102.

In other words, the first SMC core 101 may be provided with only one of the second positioning protrusion 1016 and the second positioning hole 1017, or may be provided with both the second positioning protrusion 1016 and the second positioning hole 1017. The second SMC core 102 may be provided with a corresponding structure to match the second positioning protrusion 1016 and/or the second positioning hole 1017 of the first SMC core 101.

In order to further reduce processing difficulty of the segmented core, in the embodiments of the present disclosure, the first positioning protrusion 1014 and the first positioning hole 1015 are symmetrically arranged, and a size of the first positioning protrusion 1014 is adapted to a size of the first positioning hole 1015. The second positioning protrusion 1016 and the second positioning hole 1017 are symmetrically arranged, and a size of the second positioning protrusion 1016 is adapted to a size of the second positioning hole 1017. With this arrangement, the first SMC core 101 and the second SMC core 102 have the same structure, and the same mold may be used to process both the first SMC core 101 and the second SMC core 102.

The laminated core 200 is formed by laminations through laminating, and the laminations are silicon steel sheets or amorphous alloy sheets. In the embodiments of the present disclosure, a structure of a lamination used for laminating the laminated core 200 is simple, for example, the structure may be a rectangular structure for convenient processing. The laminations of the same size may form the lamination core 200 with a rectangular structure during a lamination process.

Figure 5:
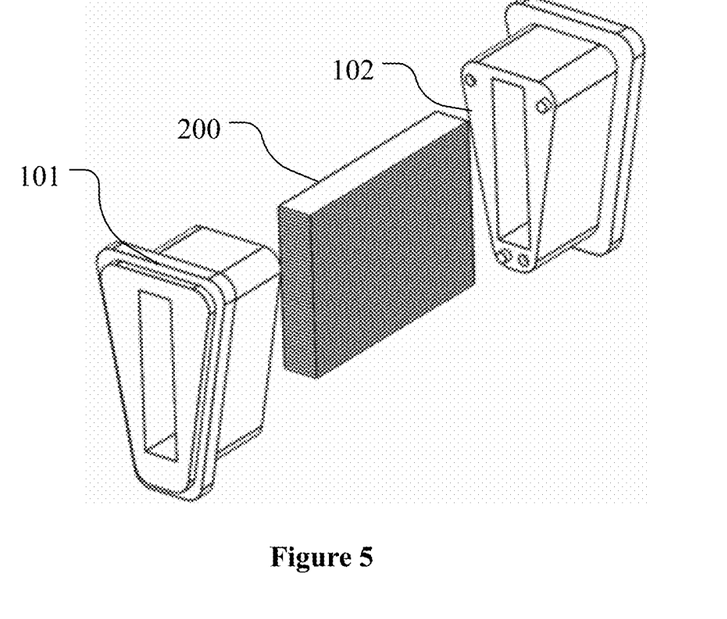
FIG. 5 is an exploded structure diagram of another segmented core according to an embodiment of the present disclosure.
Figure 6:
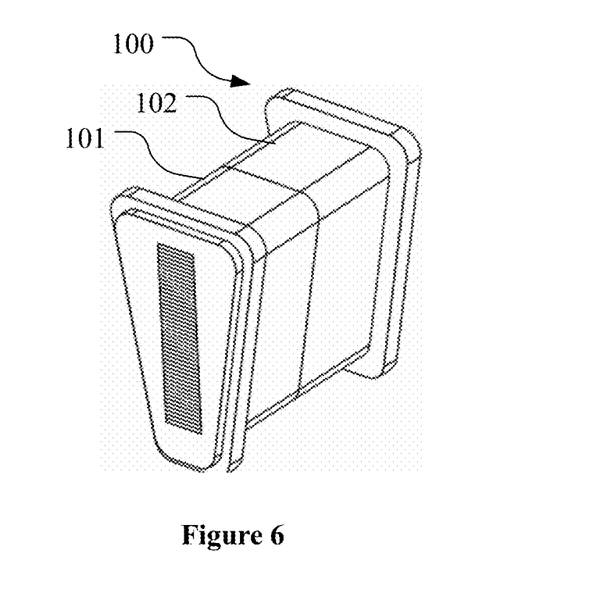
FIG. 6 is a stereochemical structure diagram of another segmented core after being spliced according to an embodiment of the present disclosure.
Figure 7:
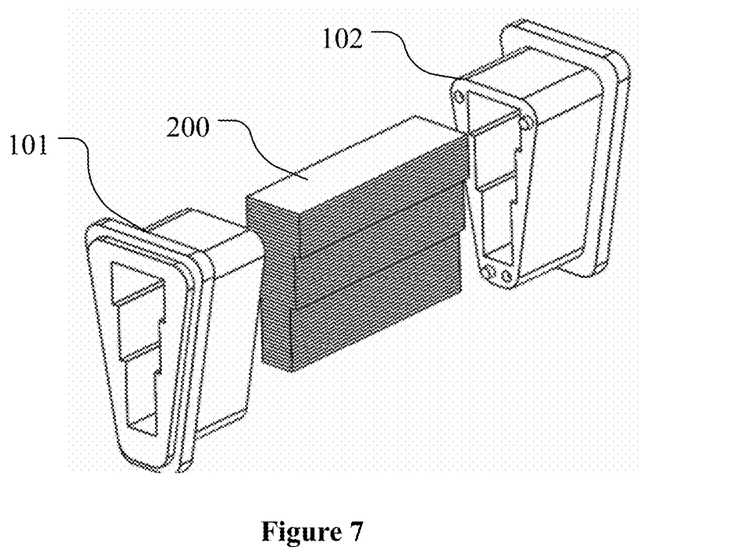
FIG. 7 is an exploded structure diagram of another segmented core according to an embodiment of the present disclosure.
Figure 8:
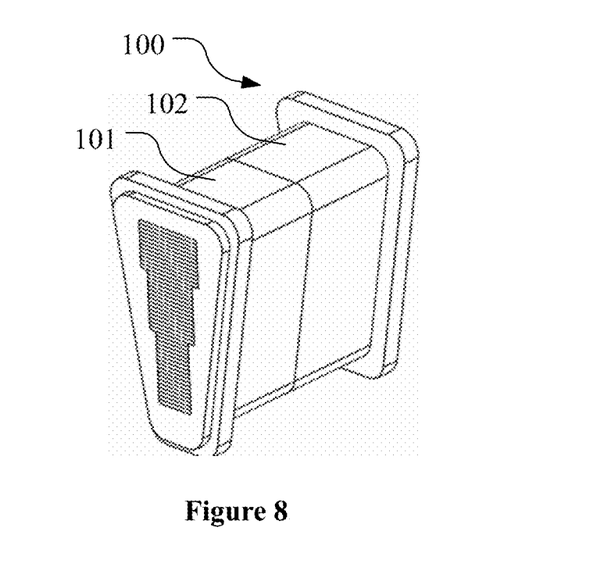
FIG. 8 is a stereochemical structure diagram of another segmented core after being spliced according to an embodiment of the present disclosure.

In addition, in order to further improve the electromagnetic performance of the entire segmented core, the laminated core 200 may be formed by multiple segments of laminations in different sizes through laminating. In one embodiment, in order to adapt to a shape of the segmented core (usually a trapezoidal structure) to the greatest extent, the greater the number of laminations of different sizes, the better. However, considering the processing difficulty, in the embodiments of the present disclosure, the laminated core 200 is formed by laminating three segments of laminations with gradually smaller sizes. The laminations in each segment have the same size, and adjacent segments have different sizes.

Figure 9:
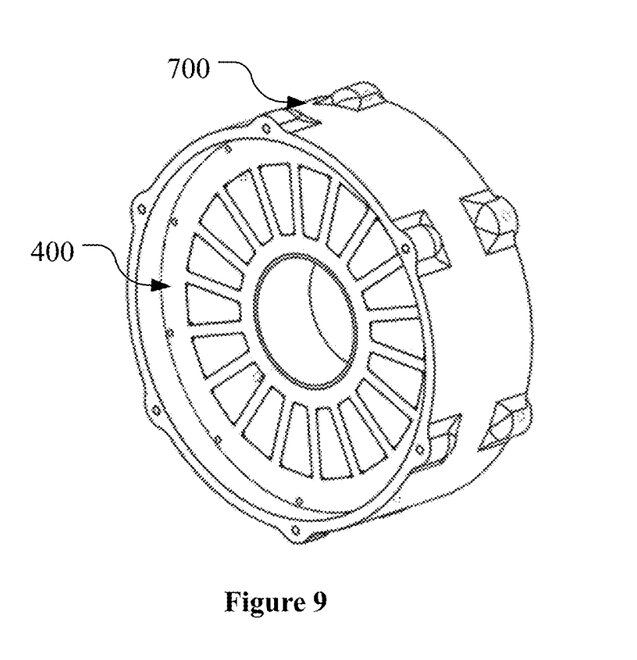
FIG. 9 is a stereochemical structure diagram of a pancake motor according to an embodiment of the present disclosure.
Figure 10:
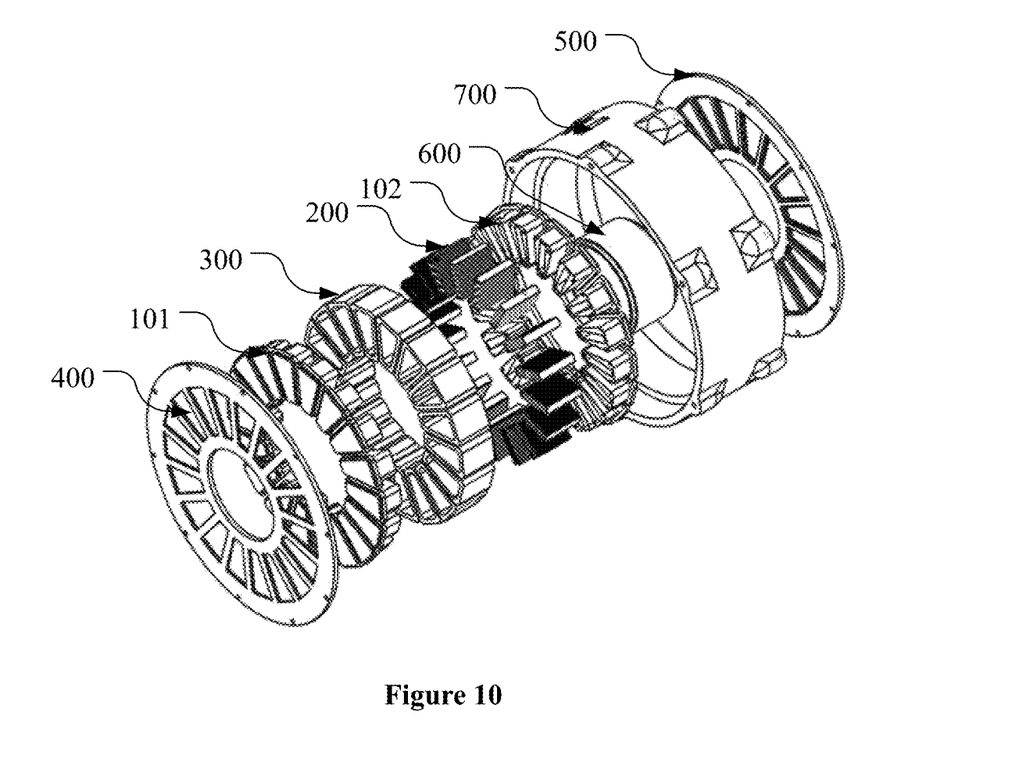
FIG. 10 is an exploded structure diagram of another pancake motor according to an embodiment of the present disclosure.
Figure 11:
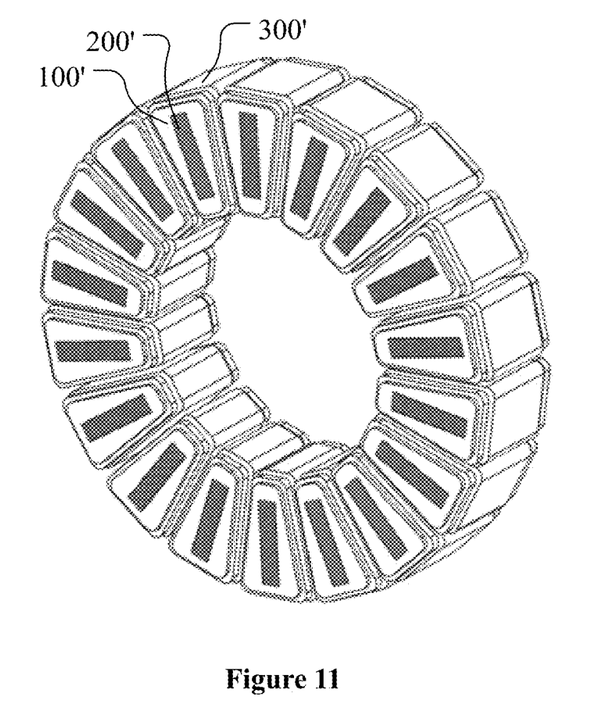
FIG. 11 is a stereochemical structure diagram of another pancake motor according to an embodiment of the present disclosure.

A pancake motor is further provided in the present disclosure, including a first stator splint 400, a segmented core, a stator inner support 600, a second stator splint 500, and a casing 700. Each segmented core is fixed in the casing 700 by the first stator splint 400, the second stator splint 500, and the stator inner support 600. The segmented core is any one of the above segmented cores. Since the above segmented core has the above advantages, the pancake motor including the above segmented core also has corresponding effects, which are not be repeated here.

Please refer to FIGS. 11 to 14, a segmented core disclosed in the embodiments of the present disclosure includes an SMC core 100' wound around with a coil 300' and a laminated core 200', the SMC core 100' is coated on a periphery of the laminated core 200'.

In the segmented core in the present disclosure, the SMC core 100' is adopted to coat the periphery of the laminated core 200'. A shape that is not easy to process is formed by processing the SMC core 100' that is easy to be molded. An overall structure of the laminated core 200' is relatively simple. Therefore, specifications of molds for processing the laminated core 200' are less, and the molds are easy to be processed, which reduces processing difficulty of the segmented core. Moreover, electromagnetic performance of the segmented core is higher than that of core with only the SMC material, and an utilization rate of the core is higher than that of core with only the laminated core 200'.

It should be noted that in the embodiments of the present disclosure, the SMC core 100' coats a periphery of the laminated core 200', two ends of the laminated core 200' are not coated. The SMC core 100' coats the entire or part of the periphery of the laminated core 200'. When a part of the periphery is coated, a part of the laminated iron core 200' is exposed. There may be one concentrated part of the laminated core 200' that is exposed to outside, or the two ends of the laminated core 200' have parts that are both exposed to the outside.

Figure 12:
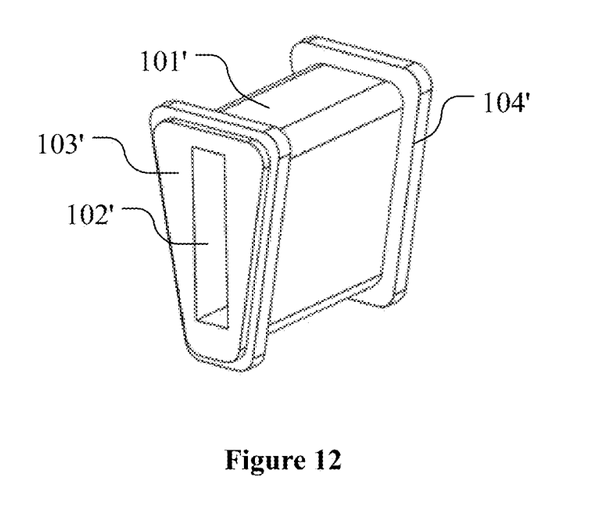
FIG. 12 is a stereochemical structure diagram of another SMC core structure according to an embodiment of the present disclosure.
Figure 13:
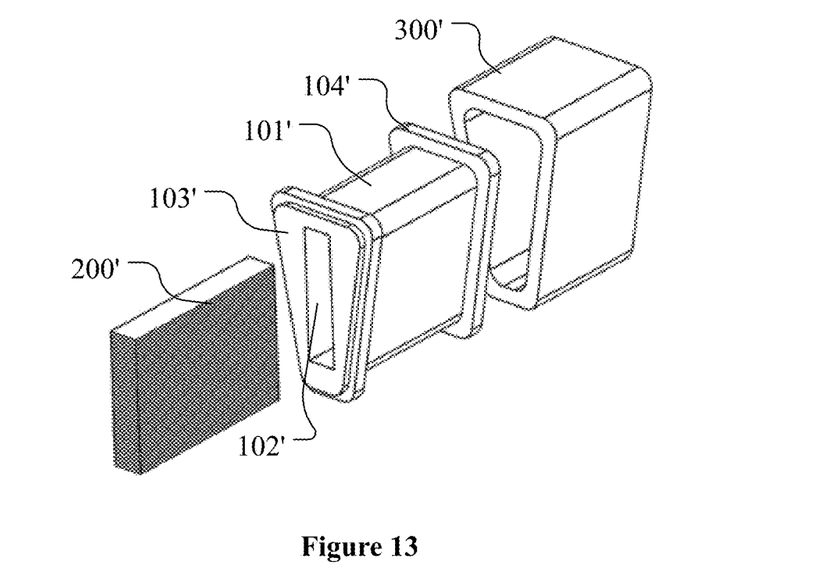
FIG. 13 is an exploded structure diagram of another segmented core according to an embodiment of the present disclosure.
Figure 14:
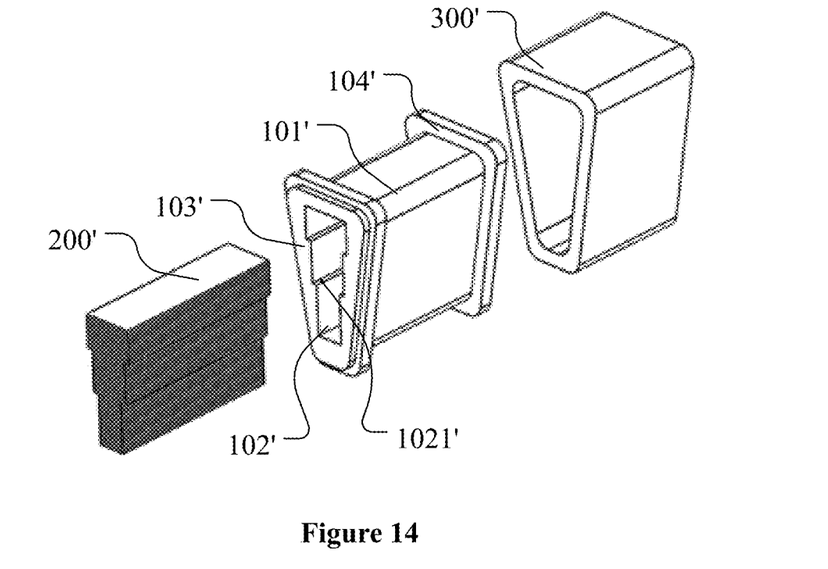
FIG. 14 is an exploded structure diagram of another segmented core according to an embodiment of the present disclosure.

The SMC core 100' includes an SMC winding bar 101' and an SMC embedded groove 102' arranged on the SMC winding bar 101'. A periphery of the SMC winding bar 101' is configured to set the coil 300', and the laminated core 200' is installed in the SMC embedded groove 102'. In order to ensure entire electromagnetic performance, a shape of the SMC embedded groove 102' fits a periphery of the laminated core 200' in the embodiments of the present disclosure, for example, the SMC embedded groove 102' has a rectangular structure; or the SMC embedded groove 102' is provided with multiple steps 1021'.

In order to optimize the above solution, an end surface of the SMC winding bar 101' is provided with a first SMC pole shoe 103'. Further, an end surface of the SMC winding bar 101' opposite to the end surface provided with the first SMC pole shoe 103' is provided with a second SMC pole shoe 104'.

The laminated core 200' is formed by laminating laminations, and the laminations are silicon steel sheets, amorphous alloy sheets, permalloy sheets, or iron-cobalt alloy sheets. In the embodiments of the present disclosure, a structure of a lamination used for laminating the laminated core 200' is simple, for example, the structure may be a rectangular structure for convenient processing. The laminations of the same size may form the lamination core 200' with a rectangular structure during a lamination process.

In addition, in order to further improve the electromagnetic performance of the entire segmented core, the laminated core 200' may be formed by multiple segments of laminations in different sizes through laminating. In one embodiment, in order to adapt to a shape of the segmented core (usually a trapezoidal structure) to the greatest extent, the greater the number of laminations of different sizes, the better. However, considering the processing difficulty, in the embodiments of the present disclosure, the laminated core 200' is formed by multiple segments of laminations with gradually smaller sizes through laminating. A structure including three segments of laminations is specifically described in the drawings. The laminations in each segment have the same size, and adjacent segments have different sizes.

A pancake motor is further provided in the present disclosure, including any one of the above segmented cores. Since the above segmented core has the above advantages, the pancake motor including the above segmented core also has corresponding effects, which are not be repeated here.

The above embodiments in this specification are described in a progressive manner. Each of the embodiments is mainly focused on describing its differences from other embodiments, and references may be made among these embodiments with respect to the same or similar portions among these embodiments.

Based on the above description of the disclosed embodiments, those skilled in the art are capable of carrying out or using the present application. Many modifications to these embodiments can be made. The general principle defined herein may be applied to other embodiments without departing from the spirit or scope of the present application. Therefore, the present application is not limited to the embodiments illustrated herein, but should be defined by the broadest scope consistent with the principle and novel features disclosed herein.

The invention claimed is:

1. A segmented core, wherein the segmented core comprises a laminated core and an SMC (soft magnetic composite) core, the SMC core is coated on a periphery of the laminated core by splicing, and the SMC core is installed inside a prefabricated coil by splicing or a coil is directly wound around a periphery of the SMC core, wherein the laminated core is formed by a plurality of groups of laminations, wherein all laminations in each of the plurality of groups have a same size, and laminations in different ones of the plurality of groups have different sizes, wherein the SMC core comprises an SMC winding bar and an SMC embedded groove adapted to the laminated core, wherein the SMC core is coated on at least an entire periphery of the laminated core except two ends of the laminated core, and wherein the SMC embedded groove is provided with a plurality of steps.

2. The segmented core according to claim 1, wherein the lamination is a silicon steel sheet or an amorphous alloy sheet.

3. The segmented core according to claim 1, wherein the sizes of the plurality of groups of laminations gradually become smaller.

4. The segmented core according to claim 1, wherein laminations in a same one of the plurality of groups have a same size, and laminations in different ones of the plurality of groups have different sizes.

5. The segmented core according to claim 1, wherein the SMC core comprises a first SMC core and a second SMC core, the first SMC core and the second SMC core are coated on the periphery of the laminated core by splicing, and the first SMC core and the second SMC core are installed inside the prefabricated coil after being spliced or the coil is directly wound around the periphery of the SMC core.

6. The segmented core according to claim 5, wherein the SMC embedded groove is a non-through structure or a through structure.

7. The segmented core according to claim 6, wherein an SMC pole shoe is provided at a first end of the SMC winding bar away from the SMC embedded groove.

8. The segmented core according to claim 7, wherein a second end of the SMC winding bar close to the SMC embedded groove is provided with a first positioning protrusion and/or a first positioning hole that is adapted to the second SMC core.

9. The segmented core according to claim 8, wherein the second end of the SMC winding bar that is set with the SMC embedded groove is provided with a second positioning protrusion and/or a second positioning hole that is adapted to the second SMC core.

10. The segmented core according to claim 9, wherein in a case that the first positioning protrusion and the first positioning hole are both provided, the first positioning protrusion and the first positioning hole are arranged symmetrically, and a size of the first positioning protrusion is adapted to a size of the first positioning hole; and in a case that the second positioning protrusion and the second positioning hole are both provided, the second positioning protrusion and the second positioning hole are arranged symmetrically, and a size of the second positioning protrusion is adapted to a size of the second positioning hole.

11. The segmented core according to claim 10, wherein the second SMC core has the same structure as the first SMC core.

12. A pancake motor, comprising a first stator splint, a segmented core, a stator inner support, a second stator splint, and a casing, each segmented core being fixed in the casing by the first stator splint, the second stator splint, and the stator inner support, wherein, the segmented core comprises a laminated core and an SMC (soft magnetic composite) core, the SMC core is coated on at least an entire periphery of the laminated core by splicing except two ends of the laminated core, and the SMC core is installed inside a prefabricated coil by splicing or a coil is directly wound around a periphery of the SMC core, wherein the laminated core is formed by a plurality of groups of laminations, wherein all laminations in each of the plurality of groups have a same size, laminations in different ones of the plurality of groups have different sizes, and wherein the SMC core comprises an SMC winding bar and an SMC embedded groove adapted to the laminated core.

13. A segmented core, wherein the segmented core comprises a laminated core and an SMC (soft magnetic composite) core wound around with a coil, the SMC core is coated on at least an entire periphery of the laminated core except two ends of the laminated core, wherein the laminated core is formed by a plurality of groups of laminations, wherein all laminations in each of the plurality of groups have a same size, and laminations in different ones of the plurality of groups have different sizes, wherein the SMC core comprises an SMC winding bar and an SMC embedded groove adapted to the laminated core, and wherein the SMC embedded groove is provided with a plurality of steps.

14. A pancake motor, wherein the pancake motor comprises the segmented core according to claim 13.

15. The segmented core according to claim 13, wherein the lamination is a silicon steel sheet, an amorphous alloy sheet, a permalloy sheet, or an iron-cobalt alloy sheet.

16. The segmented core according to claim 15, wherein the sizes of the plurality of groups of laminations gradually become smaller.

17. The segmented core according to claim 13, wherein a periphery of the SMC winding bar is configured to set the coil, and the laminated core is installed in the SMC embedded groove.

18. The segmented core according to claim 17, wherein a first end surface of the SMC winding bar is provided with a first SMC pole shoe.

19. The segmented core according to claim 18, wherein a second end surface of the SMC winding bar opposite to the end surface provided with the first SMC pole shoe is provided with a second SMC pole shoe.

* * * * *